J. H. MESSENGER.
TIRE.
APPLICATION FILED MAR. 19, 1912.

1,057,164.

Patented Mar. 25, 1913.

2 SHEETS—SHEET 1.

Witnesses.

Inventor
J. H. Messenger
By
Atty.

J. H. MESSENGER.
TIRE.
APPLICATION FILED MAR. 19, 1912.

1,057,164.

Patented Mar. 25, 1913.

2 SHEETS—SHEET 2.

Witnesses.

Inventor
J. H. Messenger
By
Atty.

UNITED STATES PATENT OFFICE.

JOHN HENRY MESSENGER, OF LONDON, ENGLAND.

TIRE.

1,057,164.     Specification of Letters Patent.     Patented Mar. 25, 1913.

Application filed March 19, 1912. Serial No. 684,690.

*To all whom it may concern:*

Be it known that I, JOHN HENRY MESSENGER, subject of the King of Great Britain, residing at London, England, have invented certain new and useful Improvements in Tires, of which the following is a specification.

This invention relates to improvements in tires.

The object of the invention is to provide the tread surface of the tire with specially formed ribs and projections, to prevent skidding and to materially increase the tractional effect when passing over a road surface.

The invention also comprehends improvements in the details of construction and arrangement of parts which will be hereinafter described and particularly pointed out in the claims.

Figure 1:
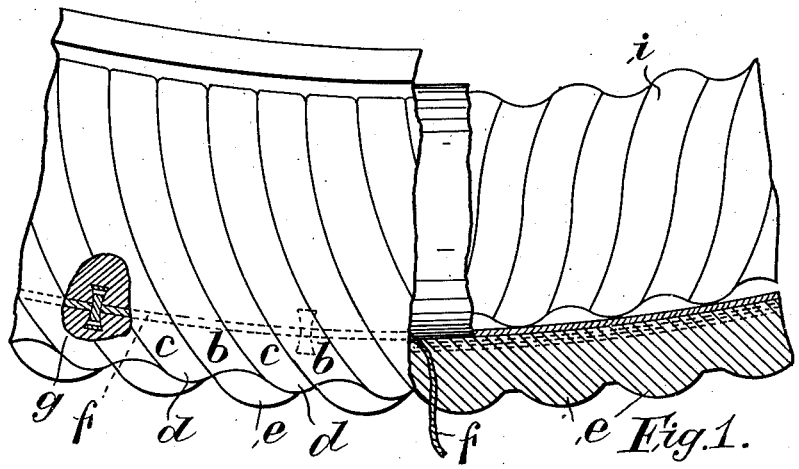
Figure 2:
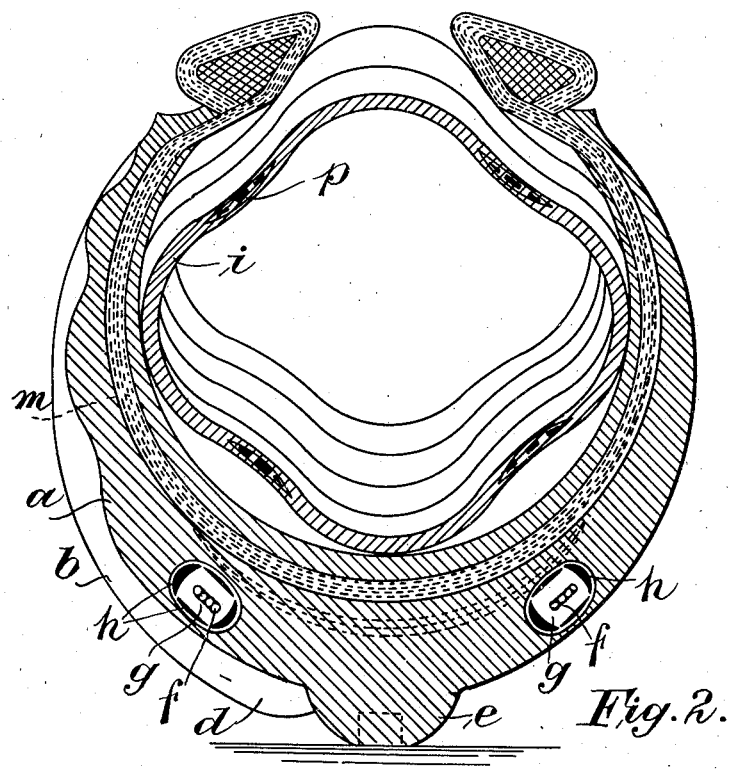
Figure 3:
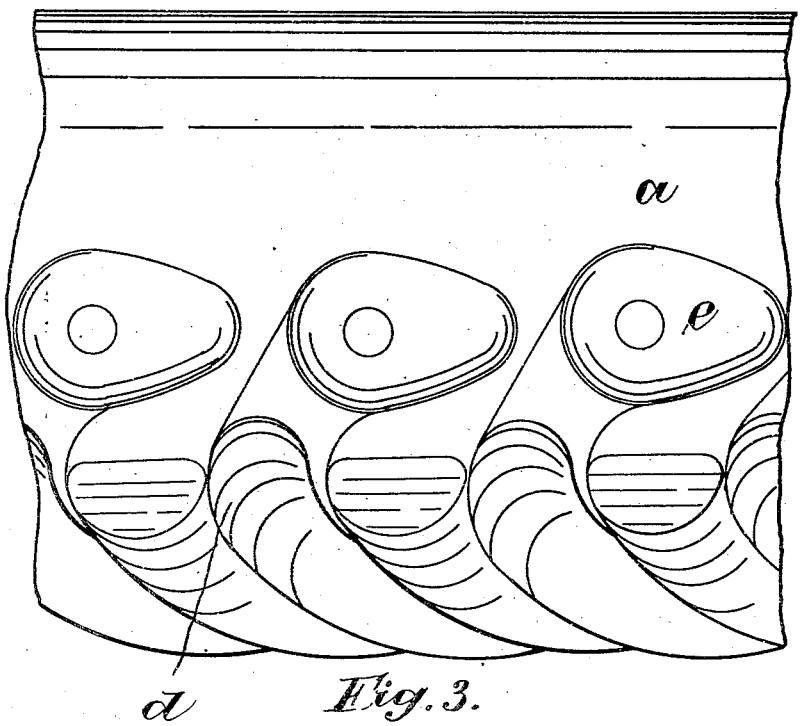
Figure 4:
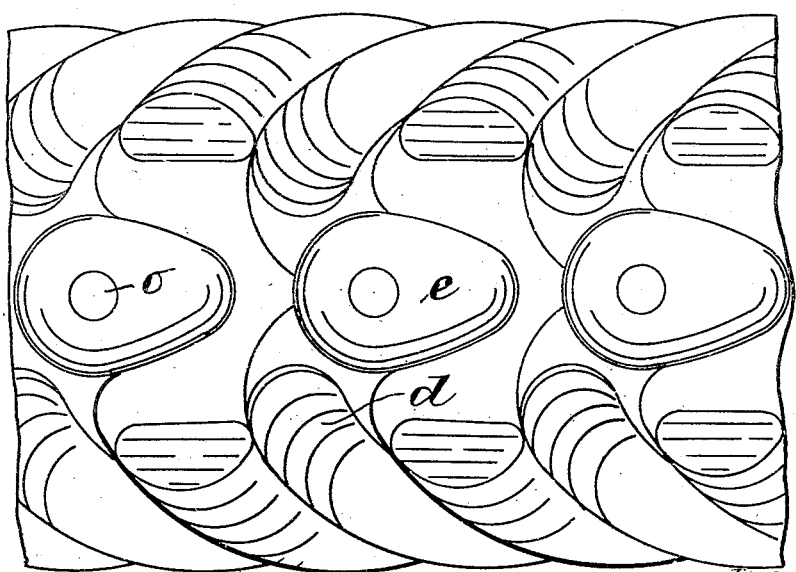

In the accompanying drawings:—Figure 1, is a side view of a portion of a tire according to the invention, the parts being broken away successively to indicate the parts in section. Fig. 2, is a cross section of the tire on a larger scale. Fig. 3, is a plan of a portion of the cover. Fig. 4, is a plan of a modified form of cover.

In the form of tire illustrated in the drawings, the tire cover $a$, is provided with inclined ribs $b$, $c$. The ribs $b$, terminate at the rise of the tread while the ribs $c$, terminate at the tread in the form of knuckles $d$, and then merge into protuberances $e$, of hemispherical or ovoid form on the tread.

When the tire is under load, the protuberances $e$, are thrust through any greasy matter on the road surface and come into contact with the firmer surface. Should there be any tendency to side slip or skidding, the knuckles $d$, as well as the protuberances $e$, are thrust firmly into contact with the road surfaces, and skidding is prevented. Metal studs $o$, may be secured to the tire cover if desired. When the tires are used on motor cars, the ribs $b$, $c$, may be provided only on the outer side of each tire as indicated in Fig. 3, but with tires used on motor cycles the ribs are preferably provided on both sides as shown in Fig. 4.

$f$, are cords which resist excessive circumferential stresses which may occur when the brakes are applied or under similar conditions.

$g$, are disks, which may be perforated as at $h$, and bind or lock the cords to the rubber structure of the cover.

The inner tube $i$, is preferably of corrugated form as shown, the corrugations being provided inside and outside.

To resist bursting or undue expansion, cords, strips of canvas $p$, or the like are embedded in the inner tube.

The special form of inner tube insures plenty of air spaces between the inner tube and cover and minimize the area of surface contact between the tube and cover, thereby tending to maintain the cover cool in use.

The usual canvas layers $m$, are preferably of open mesh formation or woven with numerous holes.

I claim:

1. A tire provided on its outer surface with a plurality of inclined ribs arranged side by side and merging into each other on the side of the tire, certain of said ribs terminating some distance from the tread surface of the tire, and the remainder of said ribs extending over the tread surface, projections on the tread surface adjacent the ribs which extend over said surface, the said latter ribs merging into the projection, the said projections extending beyond the outer tread surface of the ribs.

2. A tire provided on its outer surface with inclined ribs arranged side by side and merging into each other on the side of the tire, each alternate rib terminating short of the tread of the tire and the remaining ribs extending over the tread surface, projections extending from the tread surface, the ribs which extend over the tread merging into said projections, the projections being substantially in transverse alinement with the ends of the ribs which terminate short of the tread surface.

3. A tire provided on its outer surface with inclined ribs arranged side by side, each alternate rib terminating short of the tire tread, while the other ribs extend over the tread surface and are reversely curved, projections extending from the tread surface, said projections merging into the reversely curved portion of the ribs.

4. A tire provided on its outer surface with a plurality of inclined ribs arranged side by side and merging into each other on the side of the tire, certain of said ribs terminating some distance from the tread surface of the tire, and the remainder of said ribs extending over the tread surface, and projections on the tread surface adjacent the ribs which extend over said surface, the said latter ribs merging into the projections.

In testimony whereof I have signed my name to this specification in the presence of two subscribing witnesses.

JOHN HENRY MESSENGER.

Witnesses:
FREDERICK ERNEST SQUIRE,
JOHN T. EAKINS.